(12) United States Patent
Grosvenor

(10) Patent No.: US 7,619,660 B2
(45) Date of Patent: Nov. 17, 2009

(54) AUTOMATIC PHOTOGRAPHY

(75) Inventor: David Arthur Grosvenor, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 911 days.

(21) Appl. No.: 10/476,571

(22) PCT Filed: Oct. 1, 2002

(86) PCT No.: PCT/GB02/04458

§ 371 (c)(1),
(2), (4) Date: Oct. 31, 2003

(87) PCT Pub. No.: WO03/032629

PCT Pub. Date: Apr. 17, 2003

(65) Prior Publication Data

US 2004/0186726 A1 Sep. 23, 2004

(30) Foreign Application Priority Data

Oct. 5, 2001 (GB) ............................. 0123921.9

(51) Int. Cl.
*H04N 5/228* (2006.01)
(52) U.S. Cl. .............................................. 348/222.1
(58) Field of Classification Search ............... 348/222.1
See application file for complete search history.

(56) References Cited

U.S. PATENT DOCUMENTS

| | | | |
|---|---|---|---|
| 4,951,147 A | 8/1990 | Aknar et al. | |
| 5,579,046 A * | 11/1996 | Mitsuhashi et al. | 348/231.4 |
| 5,774,851 A | 6/1998 | Miyashiba et al. | |
| 5,924,068 A * | 7/1999 | Richard et al. | 704/260 |
| 5,995,936 A | 11/1999 | Brais et al. | |
| 6,289,140 B1 | 9/2001 | Oliver | |
| 7,299,177 B2 * | 11/2007 | Broman et al. | 704/246 |
| 2007/0189479 A1 * | 8/2007 | Scherer | 379/142.01 |

FOREIGN PATENT DOCUMENTS

| | | |
|---|---|---|
| EP | 0 729 266 A2 | 8/1996 |
| EP | 0 547 357 B1 | 1/1997 |
| EP | 0 984 660 A2 | 3/2000 |
| EP | 0 699 940 B1 | 7/2001 |
| JP | 09-065188 A * | 3/1997 |
| WO | 97/08896 | 3/1997 |
| WO | 01/54399 A2 | 7/2001 |

OTHER PUBLICATIONS

English abstract translation of JP-09-065188 A, Mar. 1997, Aoyama et al.*

* cited by examiner

*Primary Examiner*—James M Hannett

(57) ABSTRACT

In automatic photographic or electronic camera apparatus, sounds from a person are preferentially received or identified to provide an audio signal, used to produce a saliency signal (indicative of the person's response to circumstances) to control the camera or an image signal produced therefrom. The sounds are detected by a sound conduction microphone, e.g. on the head or throat of the person, or by voice identification circuitry used with a less specific microphone not necessarily mounted on the person, who may or may not be wearing the camera. Control can be in real time, or the sound or saliency signal can be recorded with an image signal for subsequent control of the latter. The audio signal is categorised by waveform analysis, e.g. for the recognition of sounds, such as speech or non-speech vocal sounds, and/or non-vocal sounds; signal amplitude may also be taken into account.

32 Claims, 2 Drawing Sheets

AUTOMATIC PHOTOGRAPHY

RELATED APPLICATIONS

Figure 1:
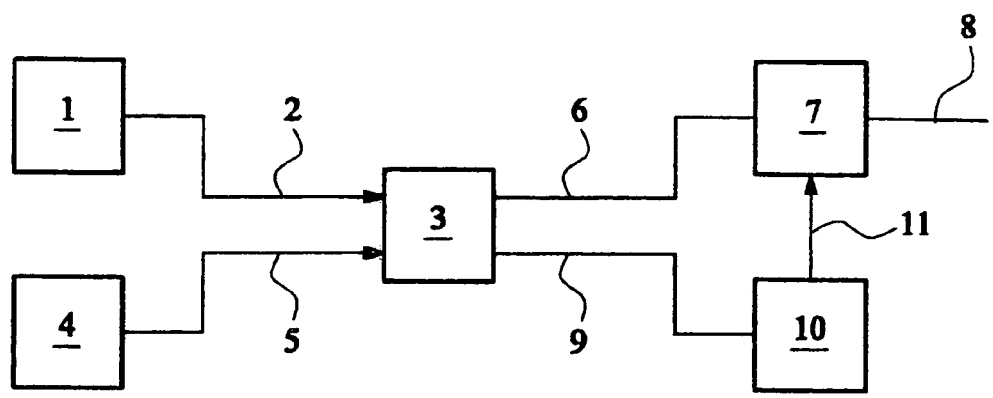

The present application is based on, and claims priority from, GB Application Number 0123921.9, filed Oct. 5, 2001, and PCT Application Number PCT/GB02/04458, filed Oct. 1, 2002, the disclosures of which are hereby incorporated by reference herein in their entireties.

The automation of photography has always been of interest, but has received increasing attention over the past few decades. Automatic exposure control and autofocus are now standard features on most cameras, and many cameras have other electronically controlled or electrical features. Video and still cameras with electronic image sensors in the form of one or more photosensitive arrays are becoming increasingly available to the public, and are popular since they provide facilities not previously available, including the means to record images cheaply, to select edit and print only those images which are considered acceptable, and to do so at home using only a PC and ancillary equipment, and to transmit and receive images using e-mail.

However, in general, cameras bought off the shelf still require an operator to decide upon the composition of the actual picture to be taken, including decisions as to picture framing (direction and zoom) and timing. While the advent of electronic cameras does provide the ability to record a number of pictures in sequence, or even a video clip, from which a suitable image can then be selected, and while this can be followed by a degree of editing, the operator still has to point the camera in generally the correct direction and to press the operating button at around the correct time.

Since both still and video electronic cameras have sensors capable of providing a sequence of image signals (an "image sequence"), they will be broadly referred to herein as "electronic cameras", and their output will be referred to as an "image signal" irrespective of whether a still image or an image sequence results, and irrespective of whether the image signal is recorded at the camera or elsewhere. References to a picture or image should be read as covering both stills and image sequences. Unqualified references to a "camera" should be read as relating either to an electronic camera or a camera using a photosensitive recording medium, e.g. a film camera for still exposures or a cine camera (a "photographic" camera).

Camera controls such as autofocus and exposure relate more to the technical side of picture taking. These have little or nothing to do with picture composition, including framing and timing, but there is now increasing interest in this aspect and the provision of intelligent still and video cameras which have a facility for picture taking or picture selection where conscious operator input is either further reduced or eliminated altogether.

One possible solution is to store the whole of the image signal from a continuously operated camera, or the whole of a sequence from a cine camera, i.e. an image sequence, and manually to select suitable single images or reduced image sequences therefrom at a later period. While this reduces the burden on a camera operator, or avoids the need for a camera operator altogether, not only does this approach require a very large amount of image signal or film storage, but if a human operator is later required to inspect the stored image sequence during the selection process it is also very time consuming and thus expensive. Therefore it is highly desirable either to have at least some degree of image selection before storage, or, if the whole image sequence is stored, to record therewith a further signal indicative of where the most interesting portions of the sequence are likely to be found.

Known types of automatic camera apparatus in which a degree of picture composition is effected encompass a broad spectrum. At one end lie forms of equipment in which the conditions for picture taking are strictly predetermined and extremely restricted, for example booths for taking passport photographs where the camera is operated with a fixed timing after a seated customer in an essentially fixed position has put money into the machine.

More freedom is permitted in apparatus where picture taking is automatically triggered in response to a predetermined condition or set of conditions, for example in response to the outcome of an algorithmic computation operating upon the output of one or more sensors. However, one problem with apparatus of this type is in defining the set of conditions necessary for picture taking to be enabled.

In certain circumstances, the prescribed conditions are physically predetermined. Security cameras which commence operation in response to an alarm input, and traffic speed cameras which respond to a vehicle being driven too fast, fall within this category. It is also known to take pictures of visitors on a ride at a theme park by triggering a suitable located fixed camera which is actuated when the car in which the visitor is riding trips a switch, such as by cutting an infra-red beam. Such systems are disclosed in International Patent Application No. WO 98/10358 (Goldberg), European Patent Application No. 0 953 935 (Eastman Kodak), U.S. Pat. No. 5,655,053 (Renie) and U.S. Pat. No. 5,576,838 Renie) for example.

Other systems allow rather more latitude, by recognition or detection of a feature associated with the feature to be imaged. Thus U.S. Pat. No. 5,844,599 (Hildin) discloses a video camera system for use with a group of people around a conference table, where each person wears a microphone, and the camera is arranged to respond by being directed towards the person who is speaking at the time, and to track the movements of that person. This is a system more intended for viewing than image recordal. European Patent Application No. 0 660 131 (Osen) describes a system where global positioning systems are employed to track a feature, such as an aircraft, so that cameras can be automatically directed thereto.

In this respect, use is increasingly being made of tags for identifying features being imaged/or for triggering the camera. This occurs in International Patent Application No. WO 98/10358 (Goldberg) mentioned above and in U.S. Pat. No. 5,694,514 (Evans) to enable pictures of different features to be easily identified. International Patent Application No. WO 98/10358 (Goldberg) describes a number of camera systems including the use of a tag to actuate a camera and to provide data for associating the image with the person wearing the tag; in a variant, facial recognition is used to identify the feature, working from an image and other relevant data initially fed into the system.

However, in comparison to a personal camera user who can employ a hand-held camera at any time and wherever they are to take pictures of anything considered to be of interest, in all of the prior art mentioned above there remain significant restrictions as to the manner of picture taking. Most known automatic camera apparatus either employs a fixed camera and/or has narrow limitations on the circumstances under which the camera is triggered, e.g. in response to a tag or a conditional or alarm input associated with a restricted condition or set of conditions.

In commercial installations such as theme parks, the cameras are essentially fixed and located to capture an image under specific circumstances, for example where it is anticipated that at least some of the stored images will prove to be sufficiently composed and appealing to be of interest to a would-be purchaser.

It would be desirable to be able to provide a camera which is portable and which can automatically capture different images irrespective of the person's location, as would be the case for a manually operated camera.

It could therefore be considered that a further desirable feature of an automatic camera apparatus is the provision of a signal (a "saliency" signal) indicative of when the viewed image may relate not be of a predetermined type but may nevertheless be interesting to a person, e.g. the camera user. This signal could be used to trigger selective camera operation or selective image storage in real time, or it could be used in conjunction with a continuously stored image signal in a later image selection process; if the signal has more than two values, i.e. indicative of the relative likelihood that the image relates to an interesting feature, then a combination of these techniques could be adopted, viz. storage of all signals possibly of interest whilst rejecting other signals, and later selection from the stored signals, with initial preference being given to those parts of the signal indicated as being more interesting. Such a feature is contemplated in respect of the present invention.

It is known that sounds coming from a person can be indicative of the person's reaction to the environment where the person is located. Such reactions may be to a particular event or to the general ambience of the environment. The reaction could be, for example, to a viewed or visible scene or event, to an interaction with another person, to sounds whether sudden (such as a bang) or continuous (such as music) and to other stimuli such as those experienced when partaking in an event or when enjoying entertainment such as a fairground ride. Whatever the reaction, when it occurs the scene viewed by the person may either represent the cause of the reaction, or at least be evocative, at a later date, of the cause of the reaction. Accordingly, in embodiments of the present invention the sounds emitted from a person are employed in the production of a saliency signal. The invention finds particular use with cameras which are portable or carried by a person, but is not restricted thereto, and may be used with cameras which are mounted on inanimate objects, which can move, or are mounted at fixed locations, or which follow a fixed track In a first aspect the present invention provides imaging apparatus comprising an electronic camera providing an image signal, sound detection means capable of preferentially receiving or identifying sounds from a predetermined person and producing an audio signal in response thereto, and recording means for recording the audio signal together with the image signal. In the first aspect, the invention may further comprise means for playing back the audio and image signals, audio means for providing a saliency signal in response to the replayed audio signal, and control means responsive to the saliency signal for controlling the replayed image signal.

In a second aspect the invention provides imaging apparatus comprising a camera, camera, sound detection means capable of preferentially receiving or identifying sounds from a predetermined person and producing an audio signal in response thereto, and audio means for providing a saliency signal in response to the audio signal, and control means responsive to the saliency signal for controlling the camera.

In the second aspect, preferably the camera is an electronic camera providing an image signal, but it could be a conventional still or cine film camera. Control of the camera may be actuation for taking a picture.

In a third aspect the invention provides an electronic camera providing an image signal, sound detection means capable of preferentially receiving or identifying sounds from a predetermined person and producing an audio signal in response thereto, audio means for providing a saliency signal in response to the audio signal, and control means responsive to the saliency signal for controlling the image signal.

The invention extends to methods of imaging using apparatus according to the first to third aspects.

As particularly described later, a preferred sound detection means is a sound conduction microphone adapted to be fitted to the head of a wearer (the "predetermined person") for preferentially detecting sounds emitted from the wearer's head and/or throat and producing an audio signal in response thereto. However, other techniques are known for preferentially receiving or identifying sounds from a predetermined person, and use thereof in lieu of the use of a sound conduction microphone falls within the scope of the present invention. These techniques include the use of voice recognition software acting on a microphone capable of receiving sounds from more than one person, for example—such software may be trained to recognise speech, in particular, from a specific user. Nevertheless, the use of a sound conduction microphone can often offer a particularly simple and effective way of performing the intended function.

Sound conduction mounted microphones, which are common to all three aspects of the invention are well known, and normally include a vibration transducer for detecting sound vibrations conducted through the wearer's body, the bone(s) of the skull for head and ear mounted microphones. They are differentiated from microphones which pick up sound transmitted through the air.

Typical examples of ear mounted microphones are described in International Patent Application No. WO 86/07157 (ACR Electronics); U.S. Pat. No. 4,588,867 (Konomi) and U.S. Pat. No. 5,692,059 (Kruger). Other skull mounted microphones are secured to the top of the head. All of these include a vibration transducer for picking up sounds directly transmitted through the head, normally via bone conduction. Another typical form of head mounted microphone is mounted in physical contact with the throat. Sounds transmitted through the air may also be sensed by these microphones. Circuits for operating such microphones are disclosed for example in International Patent Application No. WO 00/21194 ((Resound Corporation) and in European Patent Application Serial No. 0 984 660 (Nippon Telephone and Telegraph Corporation).

Cameras which are activated by a sound signal are known. Examples are disclosed in U.S. Pat. Nos. 5,014,079 and 5,107,288 both to Konica Corporation; and U.S. Pat. No. 5,162,832 (Konishoroku Photo Ind.), but in general they are arranged to respond only to one particular sound feature, for example the envelope of intensity (or sound pressure) in these particular cases, and the microphone is located at the camera and is not a sound conduction microphone.

Also known from U.S. Pat. No. 5,844,599 (Lucent Technologies Inc.) is an automatic camera system for use at conferences where each participant is provided with a microphone which acts as a tag when that person is speaking, the system being arranged so that the camera is automatically pointed at the speaker, or the loudest speaker. Although this system involves personal microphones, they are not specifically sound conduction microphones, and the only sound parameter which is utilised is the sound intensity.

None of this prior art is directed to the use of an audio signal from a head or throat mounted sound conduction microphone for control of the operation of a camera or the control of an image signal produced therefrom.

Systems also exist for the classification of sounds, and the audio means mentioned above may comprise audio analysis means for analysing the waveform of the audio signal to categorise it as falling within one of a set of predetermined categories.

U.S. Pat. No. 5,712,953 (Langs) discloses a system for classifying an audio signal as music or non-music, and refers to other such prior art. Perhaps more pertinently for the present invention, U.S. Pat. No. 5,918,223 (Muscle Fish) discloses a system for the more detailed classification of audio signal by comparison with given sound signals. The system is said to be useful in multimedia database applications and Internet search engines for finding audio data files which sound similar to the given sounds. One given example is the identification of applause and cheers in a soundtrack. Classes of sounds such as "bird sounds" or "rock music" can be created by the user.

In a basic form of the apparatus of the invention the audio analysis means may be adapted to recognise only one particular form of sound, such as laughter, emitted by the predetermined person, and in such a case the most basic set of categories will consist of "laughter" and "other".

However, it is possible to categorise a number of sounds emitted by the predetermined person, albeit some with more difficulty than others, thus to enlarge the range of identifiable categories and/or events to which the categories relate. Sounds from the head of a predetermined person can be split into non-speech and speech, which need to be considered separately.

Typical non-speech sounds include vocal sounds such as laughter, crying, humming, coughing and sneezing, and non-vocal sounds such as sniffing, scratching, eating, teeth grinding (bruxism) and eructation.

Speech itself can be split into words and the manner in which they are spoken (prosody). Word recognition techniques are sufficiently advanced for many words to be accurately recognised. Prosody includes such features as the voice intensity pattern (raised or lowered voice, or a pattern of variation such as is associated with the reading of a string of sentences or a poem, the asking of a question, or the making of a statement; hesitation; the manner in which words are spoken, i.e. the different stresses associated with syllables; the frequencies in the voice; speaking rate; the duration of parts of speech. It consists of a phonological aspect, identifying discrete abstract units of speech, and a phonetic aspect relating to continuously varying acoustic information associated with such units, and may reflect the mood of the predetermined person, e.g. excitement, anger or relaxation.

Some sounds, such as singing may be considered as falling into both speech and non-speech associations.

In the invention the categorisation performed by the audio analysis means may additionally be a function of the overall signal (envelope) amplitude, although this may be considered to be part of prosody in any case where speech is involved.

Thus the audio analysis means may be arranged for the recognition of vocal sounds, and for recognising whether the sounds are associated with speech or non-speech. Where speech is involved, the audio analysis means may be arranged for word recognition and/or for the recognition of features associated with prosody. However, the audio analysis means may alternatively or additionally be arranged for the recognition of non-speech vocal sounds and or for the recognition of non-vocal sounds.

In addition, the audio analysis means may be arranged to take account of the overall signal amplitude or envelope when assigning a category to the audio signal. For example it may be arranged to differentiate between loud laughter and quiet laughter.

The audio analysis may be provided with a predetermined series of reference waveforms against which to perform the categorisation. Alternatively or additionally, and preferably, it may be arranged so that it can be trained to recognise new sounds so that it can be adapted to the specific mannerisms of the predetermined person.

Word recognition may be useful for voluntary and involuntary camera or image signal control. Words and expressions such as "Hello", "Goodbye", "Wow" and "Go on" may be useful for involuntary initiation of picture taking when dealing with people or attending an event, whereas a command such as "Take that" may be recognised as a deliberate command to take a picture. Words such as "Yes" when spoken with a sense of triumph, or "No" when spoken as in disbelief are examples of word recognition combined with prosody. Laughter and humming may be taken as two examples of non-speech vocal sounds which could initiate picture taking or selection. Loud laughter may unconditionally effect such initiation, whereas softer laughter may need to be combined with a further conditional signal to determine whether or not this is effected.

A saliency signal may be developed according to the categorisation thus performed. In it simplest, and possible most practical form, the saliency signal is binary, so that a "yes" or "no" signal is issued at any time in response to the sound from the microphone. This may be utilised alone or in logical combination with other control signals for use as a control signal. The latter may be used for example for controlling the camera or the image signal, for example by telling the camera to take a picture or to commence an imaging sequence, or by operating a gate for selective transmission display or recording of the image signal.

Alternatively the saliency signal may have a range of discrete or continuous values. This may be useful for someone scanning through a complete image sequence, either for identifying particular sounds associated with a particular value of saliency signal, or for searching for the most interesting sounds as defined by a predetermined ordering of values assigned to different sounds. Also, in such a form it could be numerically combined, for example according to a predetermined algorithm, with other signals for producing a control signal of the type mentioned in the preceding paragraph, possibly after thresholding the resulting signal.

To derive a numerical saliency signal, different recognised sounds (and this could include similar sounds having different intensities as being different recognised sounds) may be assigned different values. This may be sufficient, or where intensity has not already been taken into account, the assigned value may be modified continuously according to the intensity of the sound.

In a preferred form of the invention the camera is worn by the predetermined person, is preferably a sound conduction microphone wearer, and is preferably worn so as to point forwards of the wearer. While the camera could be chest mounted, e.g. as a badge, it is particularly preferred that the camera be provided with fastening means for locating it, or at least the imaging optics thereof, to the head of the person, for example in the frame for a pair of glasses or in headgear such as a hat. In this way the camera direction more accurately follows the gaze direction of the wearer. If appropriate, the field of view of the camera may be made significantly greater than that of the human wearer, possibly to cover the full range of eye movement. This is particularly advantageous if the number of available pixels, e.g. of a sensor array in a solid state camera, is correspondingly increased so as to maintain the resolution for a view approximating the normal human field of view.

For true independent portability in the first aspect of the invention the predetermined person is also provided with a recorder for recording both the image and audio signals, e.g. for later development of the saliency signal for controlling a replayed image signal, or for indicating parts of a replayed image signal which could be of interest to the viewer.

For true independent portability in the second and third aspects of the invention the predetermined person may also be provided with the audio means for providing the saliency signal. This may then be recorded alongside the complete image signal, e.g. for use as mentioned in the preceding paragraph, or for control of the image signal, such as by gating it to a display or recorder, or for camera control or actuation.

However, any of the audio, saliency and image signals may be transmitted to a remote location if appropriate. One occasion when transmission of the audio or saliency signal is appropriate is when the camera is not worn by the predetermined person. For example, the apparatus may be part of an installation where the camera is fixed for viewing a predetermined scene, and the person then acts as a photographer voluntarily (word commands) or involuntarily (non-speech sounds) controls operation of the camera, or gating of the image signal, or at least indicates the saliency of a recorded signal. This could be of use at a special occasion such as a birthday party. It should be noted that the camera need not be fixed, and could for instance follow a predetermined track as in a fairground ride, where the predetermined person is tracked. Other suitable arrangements, and uses of the invention, will no doubt come to the mind of the reader.

While a necessary part of preferred embodiments of the invention is the use of a sound conduction microphone, it should be noted that one or more further microphones may be provided, and that at least one such further microphone may be a "conventional" microphone for receiving sound via the air.

The signal from the "conventional" microphone may be recorded, for example with the image and/or sound conduction microphone signal for replaying at a later date. In this respect it should be borne in mind that it would be more normal to replay the signal from a "conventional" microphone for listening purposes, the signal from the conduction microphone giving rise to a rather unreal sound for this purpose.

Alternatively or additionally, it may be combined with the signal from the sound conduction microphone. For example it may be possible to subtract a significant part of the sound produced by a person wearing a sound conduction microphone from the signal produced by the "conventional" microphone, leaving what may be considered to be sounds ambient to the sound conduction microphone wearer. This would also allow an inference to be made as to whether the wearer of the conduction microphone was involved in a conversation with another party, as by analysing or comparing the pattern of the ambient sound and that detected by the conduction microphone. This could be a feature determine the saliency signal i.e. the latter may be derived by analysis of the outputs of a combination of microphones, and such combination may include a "conventional" microphone.

The camera may be capable of capturing still pictures and/or image sequences. It may include a "conventional" microphone as referred to in the preceding paragraph.

The reader will understand that the audio analysis may be performed, in most cases more efficiently and effectively, by the use of Fourier techniques which are well known per se.

Figure 5:
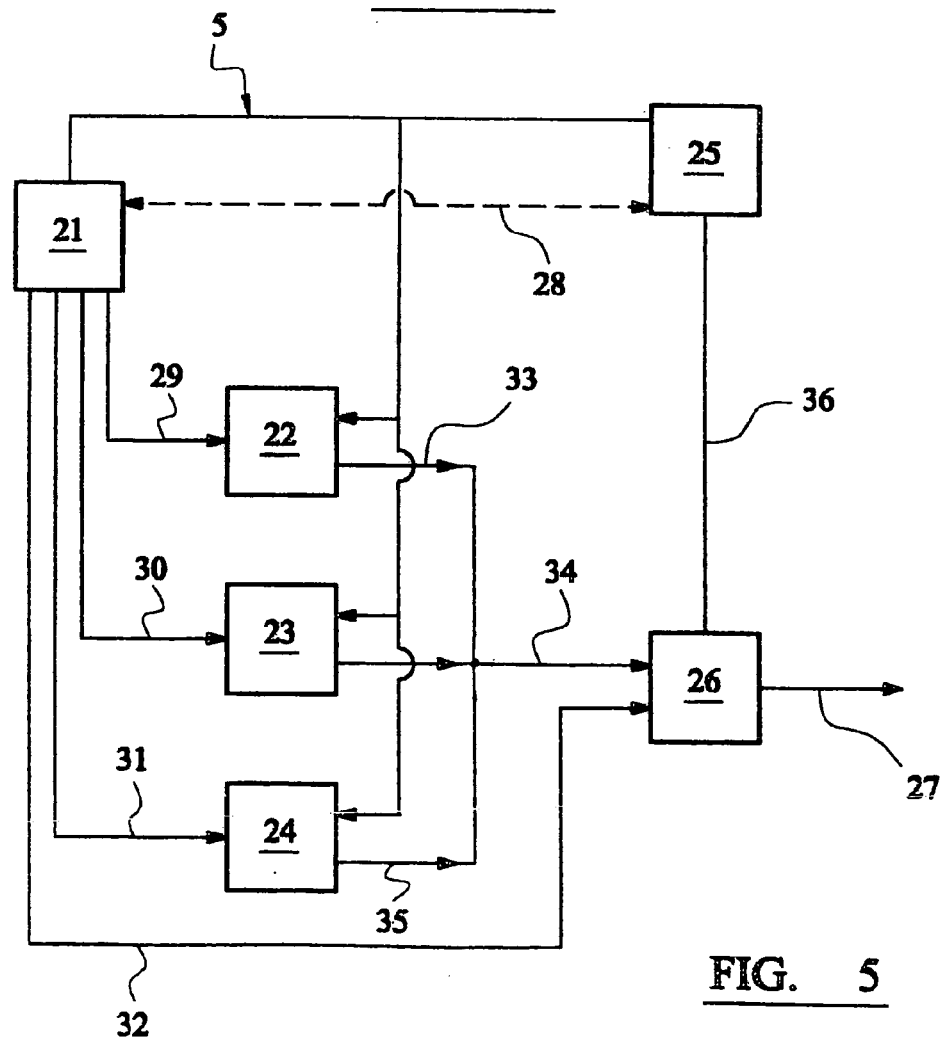

Further features and advantages of the invention will become clear upon a consideration of the appended claims, to which the reader is referred, and upon reading the following more detailed description of a preferred embodiment of the invention made with reference to the accompanying drawings in which FIG. 1 to show first to fourth embodiments of the invention in schematic form and FIG. 5 exemplifies an audio analysis in outline schematic form.

Where appropriate, like reference numbers denote similar items in each of the drawings.

In FIG. 1, a head mounted electronic camera 1 produces an image signal 2 for storage in a multi-channel recorder 3. A sound conduction ear mounted microphone 4 produces an audio signal 5 for synchronous recording with the image signal at recorder 3. Subsequently, during playback, the replayed audio signal 9 is passed to a sound categorisation circuit 10, which produces a binary (saliency) signal 11 according to whether or not the sound waveform shape approximates any one of a number of stored waveform shapes. Signal 11 is used to operate a gate 7 for selective transmission 8 of the replayed image signal 6. In a variant, the signal 11 is used to operate a signal to a human viewer of the replayed and displayed image signal 6 to indicate that particular attention should be paid thereto.

Figure 2:
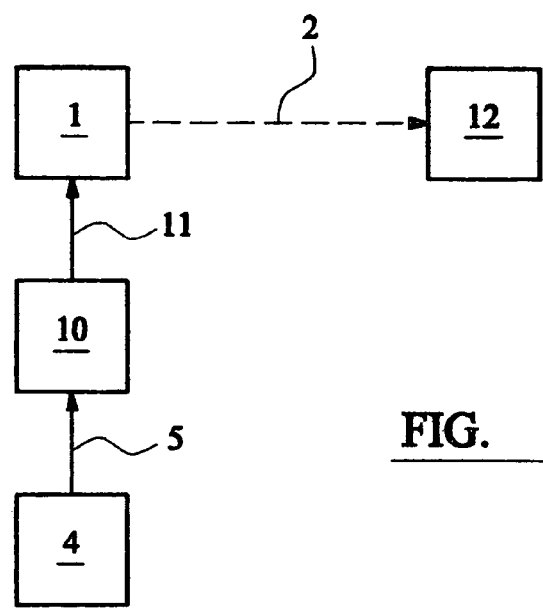

In FIG. 2, the signal 5 from a sound conduction skull mounted microphone 4 is categorised in circuit 10 and a change in the binary (saliency) output 11 in one direction is used to operate a photographic or electronic camera 1, to cause it to take a single picture or to commence an image sequence (a video or cine clip). In the latter case, the clip continues until signal 11 changes state in the other direction. Also, in the case of an electronic camera 1 the image signal 2 is recorded or displayed at 12.

Figure 3:
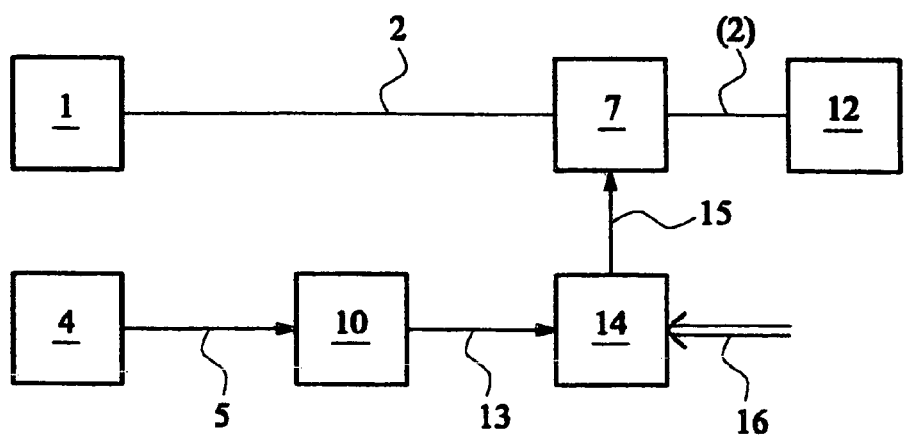

In FIG. 3, the output 5 of a throat mounted sound conduction microphone 4 is categorised in circuit 10 to produce a saliency signal 13 for control of a gate 7 selectively transmitting the image signal 2 to a recorder or display 12. The signal 13 may be a binary signal and may be directly coupled to the gate 7, but as shown, it is combined with one or more other signals 16 in a circuit 14 which produces a binary signal 15 for controlling the gate 7.

In a first form of this circuit the signal 13 and the signal(s) 16 are binary signals and they are logically combined in the circuit 14. For example the signal 13 may be ANDed with a signal 16 indicating that the picture composition (obtained by spatial segmentation of the image signal 2) is acceptable, and the result may be ORed with a signal 16 instructing the camera to take a picture in any case. The latter signal could in fact be a signal from the circuit 10 on detection of a command such as "take that", but is not necessarily so.

In a second form of this circuit, the circuit 10 assigns values (the saliency signal) to the audio signal 5 according to the type of sound which has been detected, and these values are combined in an algorithm circuit 14 with numerical signals 16 from other sources according to a predetermined algorithm, the output being thresholded to provide the binary signal 15. In this case, an over-riding command such as "take that" will be assigned an extreme value so as to determine the value of the signal 15 irrespective of the values of the signals 16.

Figure 4:
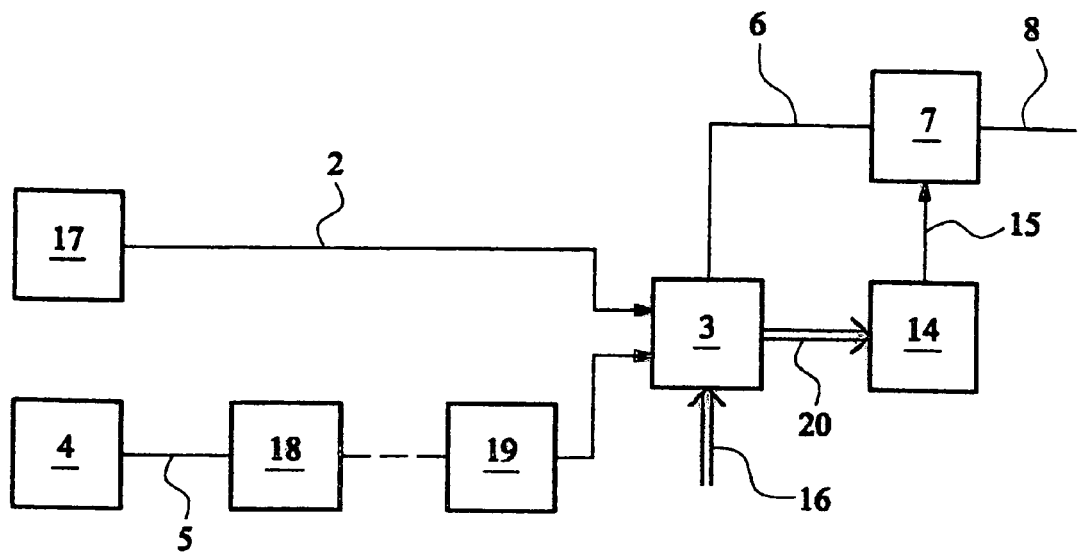

In FIG. 4 the signal 5 from ear mounted sound conduction microphone 4 is transmitted via a wireless coupling 18, 19, e.g. via rf, infra-red or induction, to a multi-channel recorder 3 which also receives the image signal output 2 of a fixed camera 17, and control signal(s) 16 from at least one other source. Subsequently the signals are replayed as image signal 6 and control signals 20, the latter being processed by a circuit 14 and used to control image signal gate 7 as in FIG. 3.

In a variant of FIG. 4, the camera is fixed to a vehicle in a fairground ride and observes the microphone wearer during the ride. One of the signals 16 is an enable signal provided for a time period including that when the ride is in progress, and a short period before and afterwards.

FIG. 5 shows in schematic form an audio analysis arrangement for providing a saliency signal 27. The audio signal 5 is received by a waveform shape analysis circuit 21 and an envelope amplitude analysis circuit 25.

The circuit 21 determines the type of waveform and produces one of a set of four signals 29 to 32 according to whether the type is determined to be vocal speech, vocal non-speech, non-vocal or indeterminate respectively. Each of the signals 29 to 31 is used to enable a respective circuit 22 to 24 to determine the degree of conformity of the waveform shape with each of a respective set of stored waveforms. The operative one of circuits 22 to 24 then proceeds to produce a label signal 33 to 35 uniquely identifying the stored waveform with which the incoming waveform most closely corresponds, providing there is sufficient correspondence, and otherwise provides a label signal signifying no correspondence, which equates to the signal 32 from circuit 21.

The signals 33 to 35 are combined and used with a digitised volume/amplitude signal 36 from the circuit 25 to address a two-dimensional look-up table. For a binary output 27 from the table, all of the table contents are either zero or one, but for a numerical saliency output, the table may contain a range of numbers.

Where in the absence of any indication of the overall waveform the determination of the envelope amplitude is a problem, circuits 21 and 25 are coupled to facilitate the determination of envelope amplitude after the waveform shape has been determined, as shown by the dotted line 28. Alternatively or additionally, the outputs 33 to 35 can be coupled to the circuit 25.

In addition, where prosody is important, the output 33 of circuit 22 together with the signal 5 may be coupled to a prosody determining circuit for providing an alternative numerical output for inputting to the table 26, the numerical output in this case being indicative of the word and the associated prosody.

The invention claimed is:

1. Automatic imaging apparatus comprising a camera, a sound detector for preferentially receiving or identifying sounds from a predetermined person and for producing an audio signal in response thereto, circuitry for providing a saliency signal in response to the audio signal, and a controller adapted to be responsive to the saliency signal for controlling the camera, wherein the circuitry is arranged to provide said saliency signal by responding to at least one of (a) prosody of speech, (b) non-speech vocal sounds and (c) non-vocal sounds.

2. Apparatus according to claim 1, wherein the camera is arranged for image recordal on a photosensitive medium.

3. Apparatus according to claim 1, wherein the camera is an electronic camera for providing an image signal.

4. Automatic imaging apparatus comprising an electronic camera for providing an image signal, a sound detector for preferentially receiving or identifying sounds from a predetermined person and for producing an audio signal in response thereto, circuitry for providing a saliency signal in response to the audio signal, and a controller adapted to be responsive to the saliency signal for controlling the image signal, wherein the circuitry is arranged to provide said saliency signal by responding to at least one of (a) prosody of speech, (b) non-speech vocal sounds and (c) non-vocal sounds.

5. Apparatus according to claim 4 and further including a recorder for recording said audio signal together with said image signal, and a playback unit for playing back the audio and image signals, wherein said circuitry is arranged to provide said saliency signal in response to the replayed audio signal, and said controller is adapted to be responsive to the saliency signal for controlling the replayed image signal.

6. Apparatus according to claim 4 wherein said controller comprises a gate for selectively transmitting the image signal.

7. Apparatus according to claim 6 wherein said controller includes combining circuitry for combining said saliency signal with other control signals to produce a gate control output for controlling said gate.

8. Apparatus according to claim 6 wherein said gate is arranged to be controlled directly by the saliency signal.

9. Apparatus according to claim 4 further including a recorder for recording the controlled image signal.

10. Apparatus according to claim 1 wherein said circuitry is arranged to provide said saliency signal by word recognition.

11. Apparatus according to claim 1 wherein the circuitry comprises an audio analyzer for analyzing the waveform of the audio signal and categorizing the audio signal waveform falling within one of a set of predetermined categories.

12. Apparatus according to claim 11 wherein the audio analyzer includes a series of reference waveforms for enabling the audio signal to be categorized.

13. Apparatus according to claim 11 wherein the audio analyzer is arranged so that it can be trained to recognize new sounds.

14. Apparatus according to claim 11 wherein the audio analyzer is arranged to take account the overall signal amplitude or envelope when assigning a category to the audio signal.

15. Apparatus according to claim 11 wherein the audio analyzer is arranged to provide a saliency signal having a value determined at least in part by the assigned category of the audio signal.

16. Apparatus according to claim 15 wherein the audio analyzer is arranged to provide a binary saliency signal according to the assigned category of the audio signal.

17. Apparatus according to claim 15 wherein the audio analyzer is arranged to provide a saliency signal having one of a plurality of values according to the assigned category of the audio signal.

18. Apparatus according to claim 15 wherein the audio analyzer is arranged to provide a saliency signal which is discretely variable as a function of the assigned category and continuously variable as a function of the overall signal amplitude or envelope of the audio signal.

19. Apparatus according to claim 1 wherein said sound detector comprises a sound conduction microphone adapted to be worn on the head or throat region of said predetermined person for preferentially detecting sounds emitted from the wearer's head and for producing said audio signal in response thereto.

20. Apparatus according to claim 19 further comprising a conventional microphone for receiving sounds via the air.

21. Apparatus according to claim 20 further including a recorder for recording the signal from the conventional microphone.

22. Apparatus according to claim 20 wherein the audio analyzer is arranged to take account of the signal from the conventional microphone when categorizing said audio signal as falling within one of a set of predetermined categories.

23. Automatic imaging apparatus according to claim 1 wherein said camera includes a fastener for fastening the camera to said predetermined person.

24. Automatic imaging apparatus according to claim 1 wherein said camera includes a fastener for fastening at least imaging optics of the camera to the head of said predetermined person.

25. Apparatus according to claim 1 wherein said camera is adapted to be mounted at a camera location other than on said predetermined person.

26. Apparatus according to claim 4 wherein the recorder is provided with a securer for securing the recorder to said predetermined person.

27. Apparatus according to 4 wherein said recorder is adapted to be located at a recorder location remote from the sound detector, and further comprising a transmitter for wirelessly transmitting said audio signal from said sound detector to said recorder location.

28. Apparatus according to 1 wherein said circuitry is adapted to be mounted at a location remote from the sound detector, and further comprising a transmitter for wirelessly transmitting said audio signal to the location where the circuitry is adapted to be located.

29. Apparatus according to 1 wherein said controller is adapted to be located at a control location remote from said circuitry, and further comprising a transmitter for wirelessly transmitting said saliency signal from said circuitry to the location where the controller is adapted to be located.

30. Apparatus according to claim 1 wherein the circuitry is arranged to provide said saliency signal by responding to at least one of the (a) prosody of speech, (b) non-speech vocal sounds and (c) non-vocal sounds void of any words.

31. Apparatus according to claim 1 wherein the circuitry is arranged to provide said saliency signal by responding to the prosody of speech.

32. Apparatus according to claim 31 wherein the circuitry is arranged to provide said saliency signal by responding to a voice intensity pattern of the prosody of speech.

\* \* \* \* \*